United States Patent
Ebeling et al.

(10) Patent No.: US 6,754,563 B1
(45) Date of Patent: Jun. 22, 2004

(54) METHOD FOR ESTABLISHING A MOTOR VEHICLE OPERATING VARIABLE THAT IS TO BE DETERMINED

(75) Inventors: Karl-Heinz Ebeling, Munich (DE); Gerd Kraemer, Baierbrunn (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 134 days.

(21) Appl. No.: 09/622,092

(22) PCT Filed: Feb. 1, 1999

(86) PCT No.: PCT/EP99/00631

§ 371 (c)(1),
(2), (4) Date: Aug. 11, 2000

(87) PCT Pub. No.: WO99/41496

PCT Pub. Date: Aug. 19, 1999

(30) Foreign Application Priority Data

Feb. 11, 1998 (DE) .......................................... 198 05 368

(51) Int. Cl.$^7$ ...................... G05D 11/00; G01M 17/00; G06F 19/00; G06F 7/70
(52) U.S. Cl. ................ 701/1; 701/29; 701/31; 701/34; 701/54; 701/55; 701/56
(58) Field of Search ................ 701/7, 55, 54, 701/56, 29, 31, 34

(56) References Cited

U.S. PATENT DOCUMENTS

| | | | | |
|---|---|---|---|---|
| 5,887,568 A | * | 3/1999 | Takeyama et al. | 123/306 |
| 5,925,086 A | * | 7/1999 | Sakai et al. | 701/66 |
| 5,967,125 A | * | 10/1999 | Morikawa | 123/520 |
| 6,007,452 A | * | 12/1999 | Sawada et al. | 477/45 |
| 6,009,851 A | * | 1/2000 | Iida et al. | 123/339.12 |
| 6,122,577 A | * | 9/2000 | Mergenthaler et al. | 180/197 |

* cited by examiner

Primary Examiner—William A. Cuchlinski, Jr.
Assistant Examiner—B J Broadhead
(74) Attorney, Agent, or Firm—Crowell & Moring LLP

(57) ABSTRACT

The invention relates to a method for establishing an operating variable to be determined of a motor vehicle in dependence on a first known operating variable and a second known operating variable, using a characteristics map for executing functions of the motor vehicle. Said characteristics map is stored in the Cartesian coordinate system in an electronic control device with the help of interpolating points. If a mathematically invertible characteristics map by which means an operating variable to be determined for a first motor vehicle function is entered on the Z-axis is provided, then by reverse interpolation using the same characteristics map, an operating variable allocated to the Y- or X-axis can also be an operating variable to be determined for a second motor vehicle function, the operating variable allocated to the Z-axis being the known operating variable for the second motor vehicle.

3 Claims, 2 Drawing Sheets

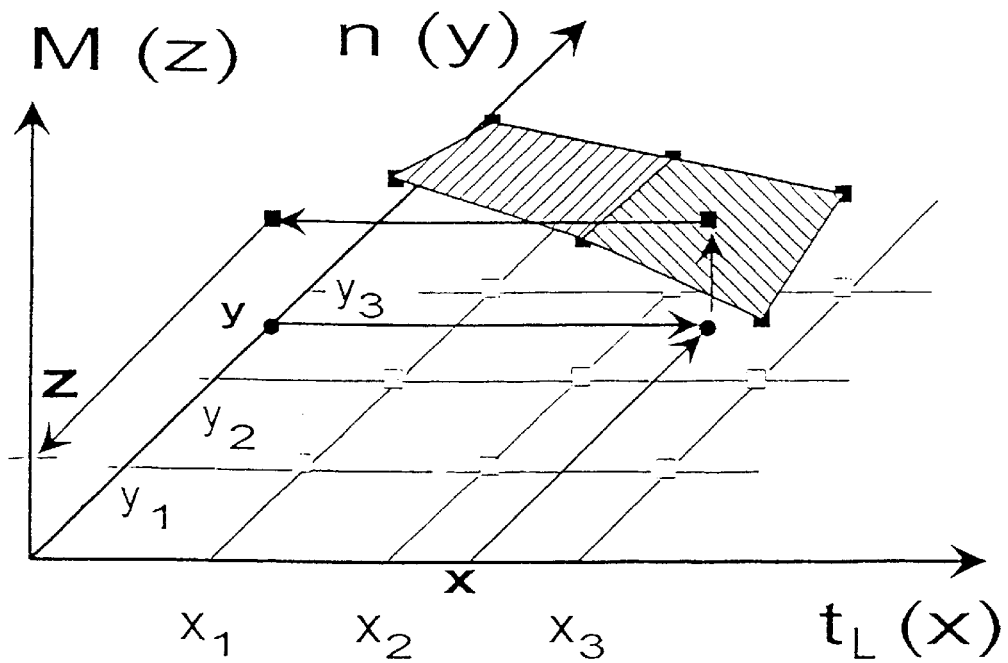
PRIOR ART    Fig. 2
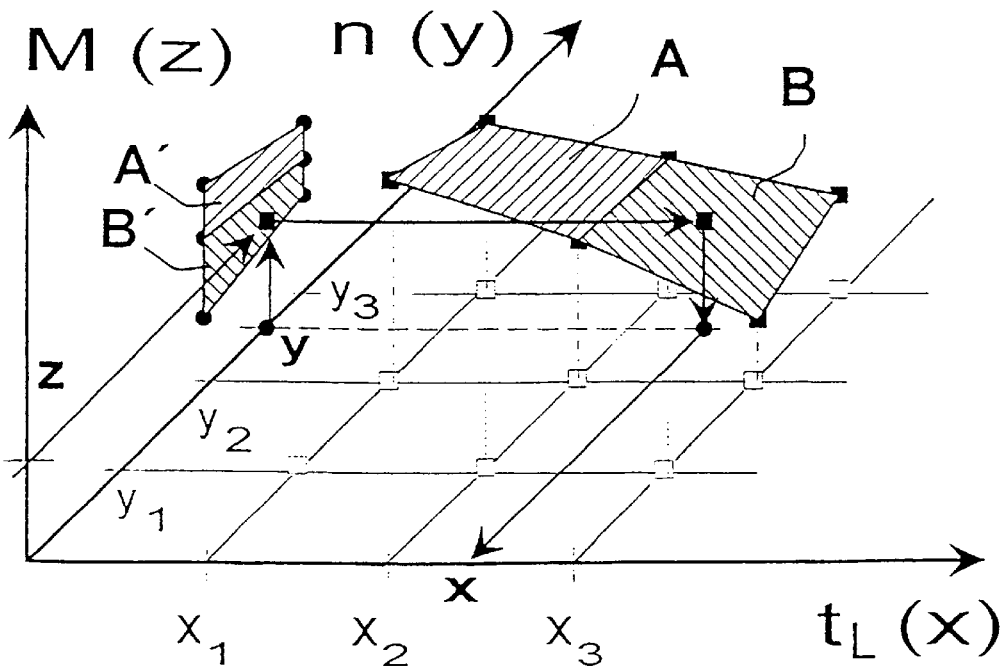
Fig. 1

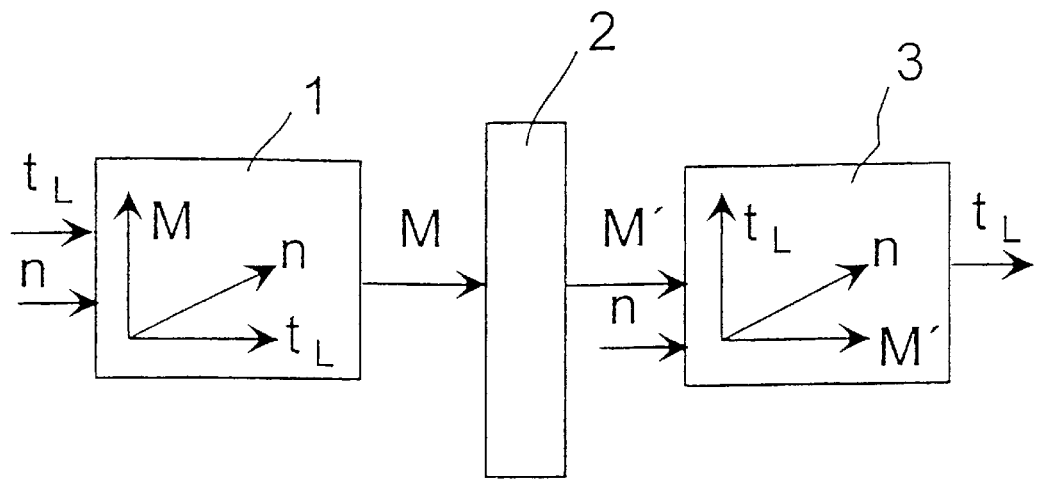
PRIOR ART          Fig. 3
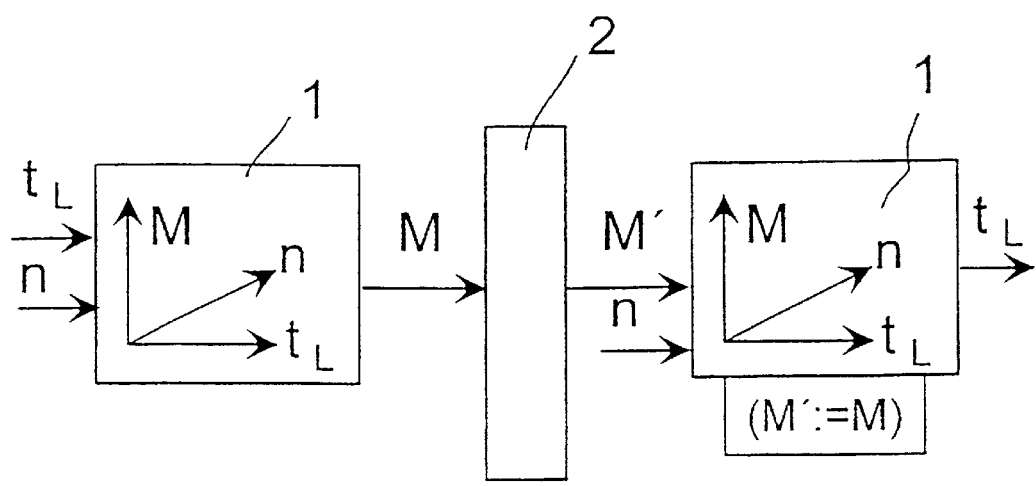
Fig. 4

METHOD FOR ESTABLISHING A MOTOR VEHICLE OPERATING VARIABLE THAT IS TO BE DETERMINED

BACKGROUND AND SUMMARY OF THE INVENTION

The invention relates to a method for determining a motor vehicle operating variable that is to be determined.

A method of this type is known, from the technical handbook "Autoelektrik, Autoelektronik am Otto-Motor", Robert Bosch GmbH, 1994 particularly in connection with electronic control units for executing internal-combustion engine functions. In this technical handbook, for example, a characteristic diagram is illustrated on Page 163 (Illustration 2), by which the advance angle is determined as a function of the rotational speed and the load as known operating variables. A characteristic diagram is illustrated on Page 165 (Illustration 6), by which the closing angle is defined for controlling an ignition coil as a function of the rotational speed and the battery voltage as known operating variables.

In principle, the surface of such a characteristic diagram in the Cartesian coordinate system (X, Y, Z axes) consists of a network of support points. Four support points respectively form a rectangular surface element in the space. The lines of the rectangular surface element in the space extend in parallel to the X-axis and Y-axis. In order to create such a regular structure of the support points or of the surface of the characteristic diagram consisting of rectangles, the support points or the characteristic diagram data may only partially be based on real measured values. If measured values are determined which do not correspond directly to the supporting points of a characteristic diagram, the pertaining values in the Z direction are determined by means of linear interpolation.

The characteristic diagrams required for motor vehicle functions are formed experimentally and are stored in an electronic control unit for the internal-combustion control, which is required anyhow. For each dependence, a characteristic diagram is stored: Z=f (X, Y).

Normally, the operating variable to be determined is assigned to the Z-axis. The operating variable assigned to the X-axis and the Y-axis, respectively, are first and second operating quantities in the form of input quantities, particularly measuring signals. A characteristic diagram of this type is normally stored for a defined motor vehicle function. Although frequently the same operating variables are processed for additional motor vehicle functions, for example, the operating variable assigned to the Z-axis can now be known, but the operating variable assigned to the X-axis or the Y-axis may have to be determined; that is, one of the input variables of a characteristic diagram can become the output variable, but the output variable of a characteristic diagram can become the input variable. In the case of the method according to the prior art, a separate characteristic diagram was stored for each of these cases, in which case the operating variable to be determined is always assigned to the Z-axis. As a result, high application expenditures and an immense storage space demand are created.

It is an object of the present invention to improve a process of the above-mentioned type such that the application expenditures as well as the storage space demand are reduced.

This object is achieved by a method for determining a motor vehicle operating variable to be determined (M; $t_L$) as a function of a first known operating variable (n; M) and of a second known operating variable ($t_L$; n) using a characteristic diagram stored by means of support points in the Cartesian system of coordinates (X, Y, Z axes) in the electronic control unit, for carrying out motor vehicle functions. When a mathematically invertible characteristic diagram is present, by means of which, for a first motor vehicle function, an operating variable (M) to be determined is entered on the Z axis, for a second motor vehicle function, by means of reverse interpolation by the same characteristic diagram, an operating variable ($t_L$) to be assigned to the Y axis or X axis may also be a operating variable to be determined when, for the second motor vehicle function, the operating variable (M) assigned to the Z axis is the known operating variable.

The use of one and the same characteristic diagram is essential to the invention, irrespective of to which axis of the coordinate system the output quantity is assigned as the operating variable to be determined. If the operating variable to be determined corresponds to the operating variable assigned to the Z-axis, the conventional approach is used. However, if the operating variable assigned to the Z-axis becomes the known operating variable, a reverse interpolation of the characteristic diagram takes place. The prerequisite is a mathematical invertibility of the characteristic diagram; that is, the characteristic diagram must extend monotonically in the X-direction and/or in the Y-direction.

As a result of the method according to the invention, the error probability is also reduced by decreasing manual expenditures.

The drawing illustrates an embodiment of the invention.

BRIEF DESCRIPTION OF THE DRAWINGS

FIG. 1 is a diagrammatic view of the reverse interpolation according to the present invention, for the example of two surface elements of a characteristic diagram in the cartesian coordinate space;

FIG. 2 is a diagrammatic view utilizing the characteristic diagram according to the prior art;

FIG. 3 is a schematic view of two motor vehicle functions with different characteristic diagrams according to the prior art; and FIG. 4 is a view of two motor vehicle functions with one and the same characteristic diagram using the method according to the invention.

DETAILED DESCRIPTION OF THE DRAWINGS

In FIGS. 1 to 4, the method according to the invention is explained in comparison to the prior art with reference to characteristic diagrams for motor vehicle functions that are assigned to an electronic internal-combustion engine control unit. In FIGS. 1 and 2, the air flow $t_L$ is plotted on the X-axis, the rotational speed n is plotted on the Y-axis, and the torque M of the internal-combustion engine is plotted on the Z-axis. By means of the six supporting points $x_1/y_2$, $x_1/y_3$, $x_2/y_2$, $x_2/y_3$, $x_3/y_2$, and $x_3/y_3$, two surface elements A and B of a characteristic diagram are set up as examples in the space. If, for a first motor vehicle function, the air flow $t_L$ and the rotational speed n are defined as input signals and thus as known operating variables, in a conventional manner, particularly when the values of the known operating variables x and y are situated between the supporting points, the value z of the torque M is determined by means of linear interpolation as the operating variable to be determined (compare FIG. 2).

If a characteristic diagram according to FIG. 1 and FIG. 2 is present and, if, for a second motor vehicle function, the torque M is the known operating variable but the air flow $t_L$ is the operating variable to be determined, a reverse interpolation according to FIG. 1 takes place according to the invention. Since the characteristic diagram cutout defined by the surface elements A and B is monotonically decreasing in the X-direction, the characteristic diagram can be mathematically inverted with respect to the X-axis. For the reverse interpolation, the surface elements A and B of the characteristic diagram in the space are projected onto the plane set up by the Y and Z-axes as surface elements A' and B'. As a result of the values y and z of the known operating variables, i.e., the rotational speed n and torque M, an intersecting point is obtained also in the plane set by the Y-axis and the Z-axis. It is examined in which projected surface element A' or B' this intersecting point (resulting from the values y and z) is situated. In this example, it is in the surface element B'. By means of a retransfer of the surface element B' including the intersecting point into the space, it can finally be determined where this intersecting point is situated on the surface element B in the space. By way of the now known location of the intersecting point in the space, again by means of linear interpolation, in a known manner, if the intersecting point is not situated on a support point, the X-value of the air flow $t_L$ operating value to be determined, which is assigned to this intersecting point in the space, can be determined.

In the example according to the state of the art in FIG. 3, for a first motor vehicle function, the air flow $t_L$ and the rotational speed n should be known operating variables and the torque M is to be the operating variable to be determined. Corresponding to the example of FIG. 2, the torque M can be determined in the conventional manner from the first characteristic diagram 1. This determined torque M can be changed in a torque coordination block 2, for example, by changing the desired torque by operating the accelerator pedal into a new value M'. In a second motor vehicle function, the air flow $t_L$ must now be determined as a function of the now known operating variables for the rotational speed n and torque M'. According to the prior art, a second characteristic diagram 3 is stored for this purpose, in which the air flow operating variable $t_L$ to be determined is assigned to the Z-axis. Therefore, according to the prior art, two different characteristic diagrams 1 and 3 are required for two motor vehicle functions, which each operate by means of two out of three identical operating variables.

With respect to the two motor vehicle functions, FIG. 4 shows the same example as FIG. 3. However, in contrast to FIG. 3, the same characteristic diagram as the first characteristic diagram 1 for the first motor vehicle function can be used for the second motor vehicle function. The new torque M' as the output signal of the torque coordination block 2 is entered as the input signal along with the known operating variable rotational speed n into the characteristic diagram 1. Subsequently, the determination of the air flow $t_L$ takes place as described in conjunction with FIG. 1.

Thus, instead of two characteristic diagrams, only one characteristic diagram must be stored in the example according to FIG. 4, whereby the establishment of a second characteristic diagram as well as the storage space demand of a second characteristic diagram are saved.

What is claimed is:

1. A method for determining a motor vehicle operating variable to be determined as a function of a first known operating variable and a second known operating variable, the method comprising the acts of:

accessing a mathematically invertible characteristic diagram for motor vehicle functions stored via support points in a cartesian coordinate system in an electronic control unit, by which mathematically invertible characteristic diagram an operating variable to be determined for a first motor vehicle function is entered on a Z-axis of the cartesian coordinate system;

reverse interpolating said mathematically invertible characteristic diagram such that an operating variable allocated to the Y- or X-axis becomes an operating variable to be determined for a second motor vehicle function, said operating variable allocated to the Z-axis becoming one of the first or second known operating variables for determining the second motor vehicle function;

wherein one and the same characteristic diagram is stored in the electronic control unit for determining the operating variable for the first and second motor vehicle functions.

2. The method according to claim 1, wherein, for said reverse interpolation, surface elements of the characteristic diagram in the space formed by the support points are projected onto a plane of the Z-axis and an additional axis, to which the operating variable to be determined is not assigned, and subsequently examining in which projected surface element an intersecting point of the values of the known operating variables is situated, and where said intersecting point is finally situated in a pertaining surface element in the space.

3. A method for determining motor vehicle operating variables that are to be determined as a function of first and second known operating variables using a characteristic diagram stored in a cartesian coordinate system with the aid of interpolation points in an electronic control unit, the method comprising the acts of:

using a mathematically invertible characteristic diagram for motor vehicle functions, stored in the cartesian coordinate system for determining an operating variable for a first motor vehicle function that is on the Z-axis, for determining an operating variable for a second motor vehicle function allocated to the Y- or X-axis using reverse interpolation of said stored mathematically invertible characteristic diagram, in which the operating variable on the Z-axis functions as one of said first and second known operating variables;

wherein one and the same characteristic diagram is stored in the electronic control unit for determining the operating variable for the first and second motor vehicle functions.

* * * * *

UNITED STATES PATENT AND TRADEMARK OFFICE
CERTIFICATE OF CORRECTION

PATENT NO. : 6,754,563 B1
DATED : June 22, 2004
INVENTOR(S) : Ebeling et al.

It is certified that error appears in the above-identified patent and that said Letters Patent is hereby corrected as shown below:

Title page,
Item [*] Notice, delete "134" and insert -- 510 --.

Signed and Sealed this

Thirtieth Day of August, 2005

JON W. DUDAS
*Director of the United States Patent and Trademark Office*